US008868505B1

(12) United States Patent
Jayanthi (10) Patent No.: US 8,868,505 B1
(45) Date of Patent: Oct. 21, 2014

(54) SYSTEMS AND METHODS FOR PROTECTING DATA IN A NETWORK HOST ENVIRONMENT

(75) Inventor: Mahendra Nag Jayanthi, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 396 days.

(21) Appl. No.: 13/424,542

(22) Filed: Mar. 20, 2012

(51) Int. Cl.
G06F 17/30 (2006.01)

(52) U.S. Cl.
USPC ........... 707/640; 707/692; 707/674; 707/654; 711/114; 711/162; 711/156

(58) Field of Classification Search
USPC ............................ 707/640; 711/114, 162, 156
See application file for complete search history.

(56) References Cited

U.S. PATENT DOCUMENTS

| 7,418,620 | B1 * | 8/2008 | Tormasov et al. | 714/6.24 |
| 2004/0064633 | A1 * | 4/2004 | Oota | 711/100 |
| 2006/0053287 | A1 * | 3/2006 | Kitamura | 713/167 |
| 2010/0106691 | A1 * | 4/2010 | Preslan et al. | 707/674 |
| 2010/0161916 | A1 * | 6/2010 | Thornton et al. | 711/154 |
| 2010/0299490 | A1 * | 11/2010 | Attarde et al. | 711/162 |
| 2013/0054523 | A1 * | 2/2013 | Anglin et al. | 707/624 |

* cited by examiner

Primary Examiner — Hamza Algibhah
Assistant Examiner — Natisha Cox
(74) Attorney, Agent, or Firm — Dergosits & Noah LLP; Todd A. Noah (57) ABSTRACT

Data protection programs are installed at each network host. The programs communicate with each other to scan the hosts and identify duplicate and unique data objects stored at the hosts. Duplicate data objects are maintained on the hosts. Unique data objects are broken into chunks, copied to other hosts, and a parity data is calculated. When a network host becomes unavailable and is replaced with a new network host, duplicate data objects stored on the now unavailable network host may be rebuilt on the new network host using the maintained duplicate data objects on the other hosts. Unique data objects stored on the now unavailable network host may be rebuilt on the new network host using the copied chunks and parity data.

15 Claims, 10 Drawing Sheets

| Host ID | Data Object ID |
|---|---|
| Host 2 ID | First Data Object A 635 Hash |
| Host 3 ID | Second Data Object A 645 Hash |
| Host 2 ID | First Data Object D 642 Hash |
| Host 4 ID | Second Data Object D 655 Hash |
| ⋮ | ⋮ |

SYSTEMS AND METHODS FOR PROTECTING DATA IN A NETWORK HOST ENVIRONMENT

BACKGROUND

The present invention relates to the field of information technology, including, more particularly, to systems and techniques for data protection.

Protecting critical data is a challenge for organizations of all sizes. According to some studies, the amount of data requiring protection continues to grow at approximately 60 percent per year. Customers need solutions to help manage the information explosion and protect and recover data.

Data stored on a network host computer may be lost for any number of reasons. For example, the network host may crash, there may be a problem with the disk media, the host may experience an electrical surge, be lost in a fire or flood, and so forth. Traditional backup solutions are costly to maintain and implement because of administrative costs, infrastructure costs (e.g., purchasing backup storage devices), power costs, and so forth.

Thus, there is a need to provide improved systems and techniques to protect data and recover data.

DETAILED DESCRIPTION

Figure 1:
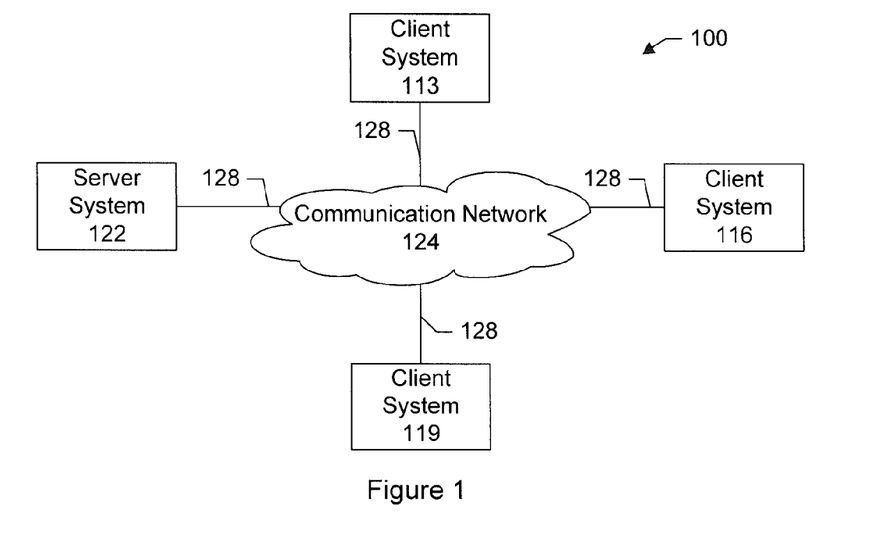
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
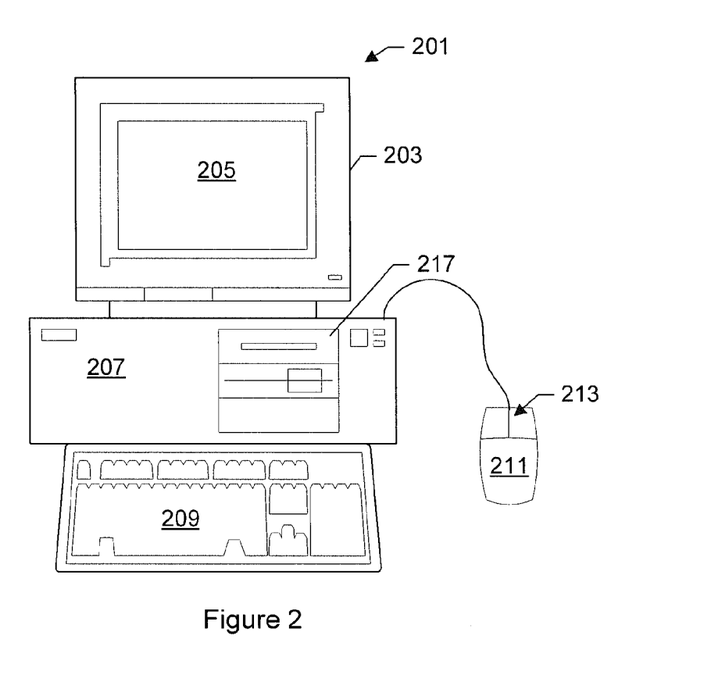
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
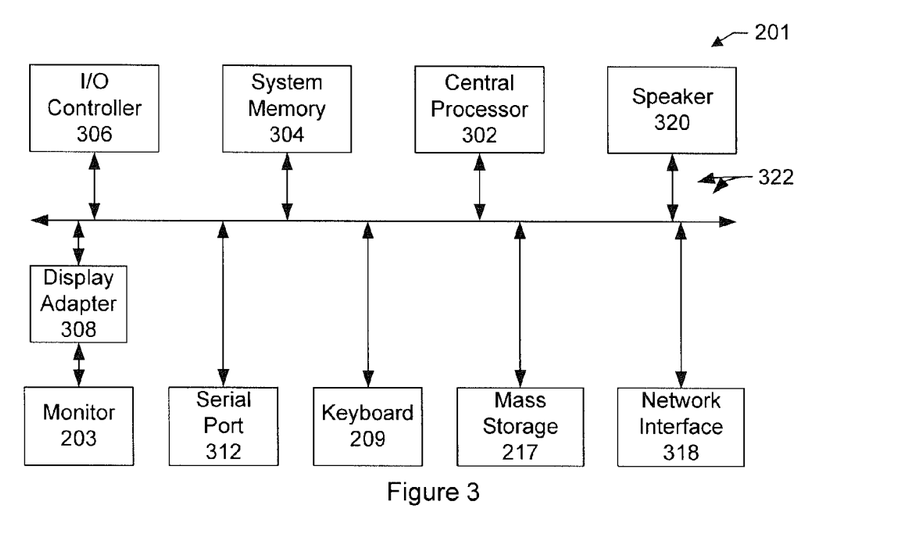
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
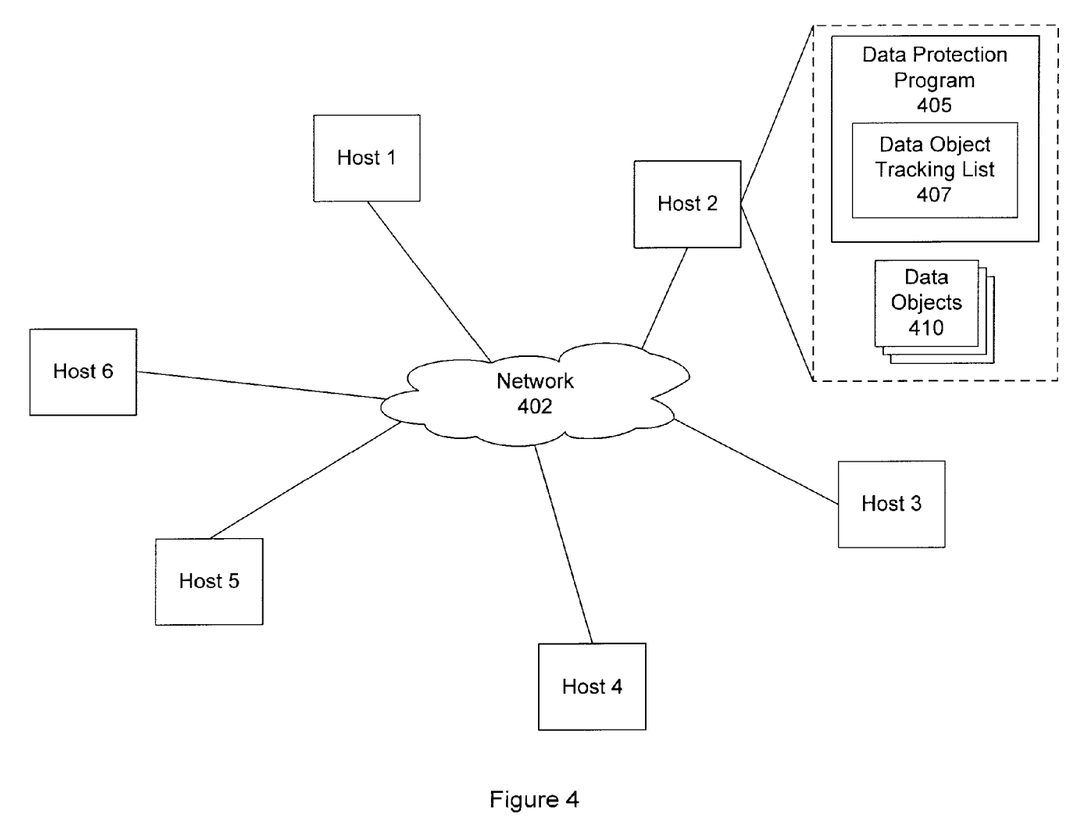
FIG. 4 shows a simplified block diagram of a network host environment.

FIG. 4 shows an environment or cluster of computing nodes in which a specific implementation of the invention may be implemented. As shown in FIG. 4, there are a set of network host computers including network hosts or clients 1-6. Each network host computer is connected to another network host computer via a network 402. A data protection program 405 is installed on each network host computer. The data protection program maintains at each network host computer a data object tracking list or database 407 that tracks a data object or unit of data, i.e., identifies the network host or hosts where the data object is located.

The network may be as shown in FIG. 1 and described above. The network hosts may be general purpose computers or computing systems such as shown in FIGS. 2-3 and described above. For example, a network host may be a server computer having hardware, software, application programs (e.g., enterprise resource planning (ERP) applications), an operating system (e.g., Linux, Windows, IBM-AIX, HP-UX, or Solaris). FIG. 4 shows six network hosts, but it should be appreciated that there can be any number network hosts including fewer than six or more than six network hosts such as hundreds or even thousands of network hosts. For example, there can be three or four network hosts, 300 or 400 network hosts, 1000 network hosts, or more than 1000 network hosts.

Data objects 410 are stored on the network hosts such as in a storage device (e.g., hard disk) of the network host. A data object may encompass a file (e.g., MS Word file, MS Excel file, or text file), a portion of a file, an application, a portion of an application, an email, a portion of an email, an object in an ERP system, an object in a customer relationship management (CRM) system, or any unit, block, or blocks of information content stored using volatile or nonvolatile memory.

The data protection program may be referred to as a data protection eye or constellation eye. The program may be implemented as a plug-in. In a specific implementation, the data protection program is installed on all the network hosts. After the installation, the data protection program scans the file system and decides which data blocks are duplicates and which data blocks are unique. Unique data blocks or data objects may be referred to as non-duplicate data blocks or objects. The program makes a list of the duplicate and unique blocks. Periodically, such as during a schedule or during off-peak hours, the data protection programs installed on the network hosts communicate with each other to exchange information and populate the duplicate and unique block lists. The data which is unique on hosts, is divided, separate, or broken into chunks and copies of which are spread across the network clients. Unique block information, duplicate block information, or both may be available in the form of hashes on network hosts. Parity of unique blocks may be maintained on most or at least some of the hosts in the network. If a host crashes or fails, the data on the host can be rebuilt using the parity.

Some advantages over other data protection techniques include providing a disk-based system rather than tape infrastructure, reducing administrative overhead costs (e.g., specialized personnel not required for management of backups, specialized personnel not required for management of infrastructure), reducing the need for backup products, reducing the time for data restorations (e.g., quick restores), reducing the need for high end backup infrastructure, providing a scalable solution, meeting heterogeneous requirements, being operating system (OS) independent, reducing the presence of complex definitions such as dataset, policy, and so forth.

Figure 5:
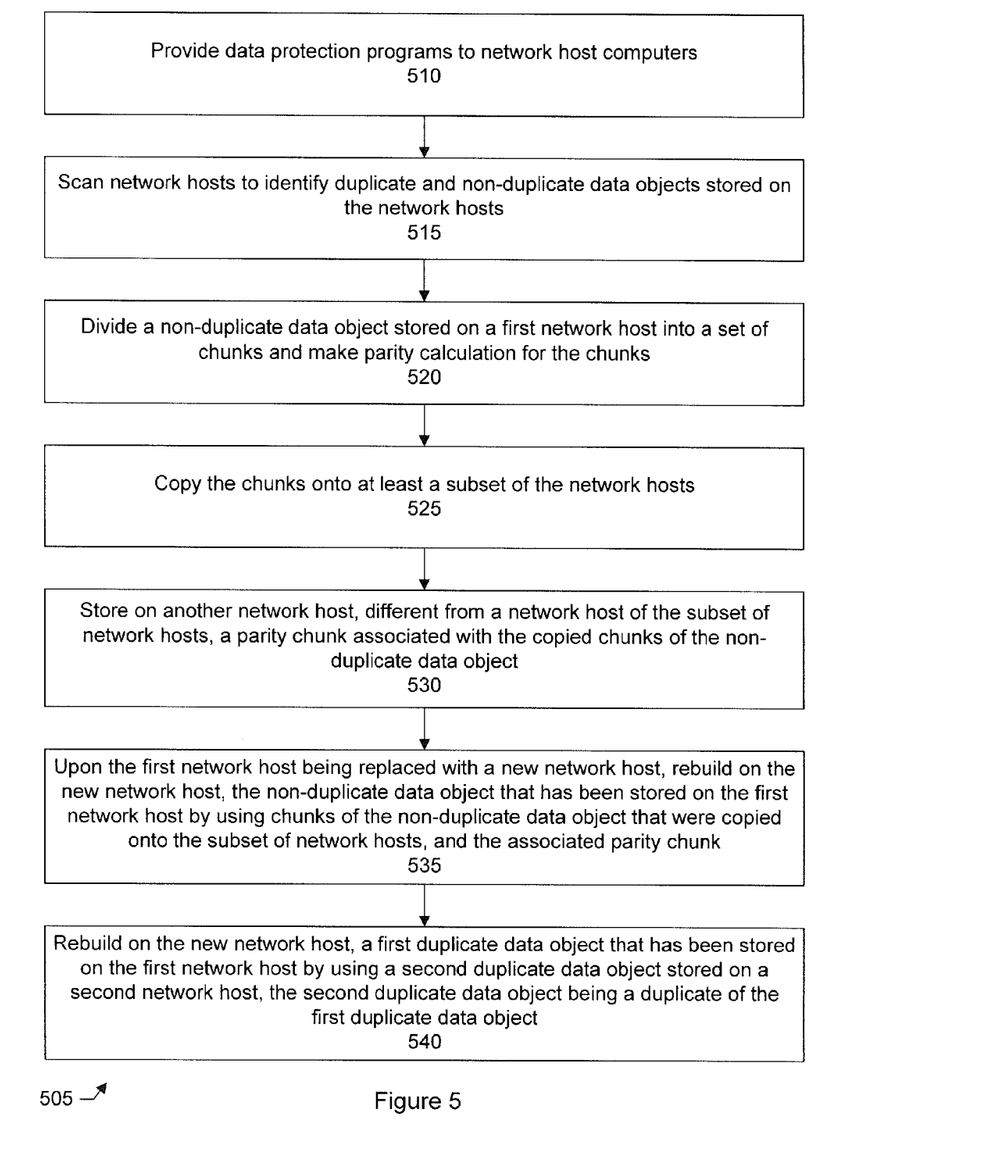
FIG. 5 shows an overall flow for protecting and recovering data on a network host.

FIG. 5 shows an overall flow 505 of a system for protecting and recovering data. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 510, data protection programs are provided to the network host computers. A data protection program may be installed or loaded into a memory of a network host computer so that the program can execute or run on the network host computer. Providing the data protection program to the network host computer can be performed as part of a setup or configuration process of the network host.

Figure 6:
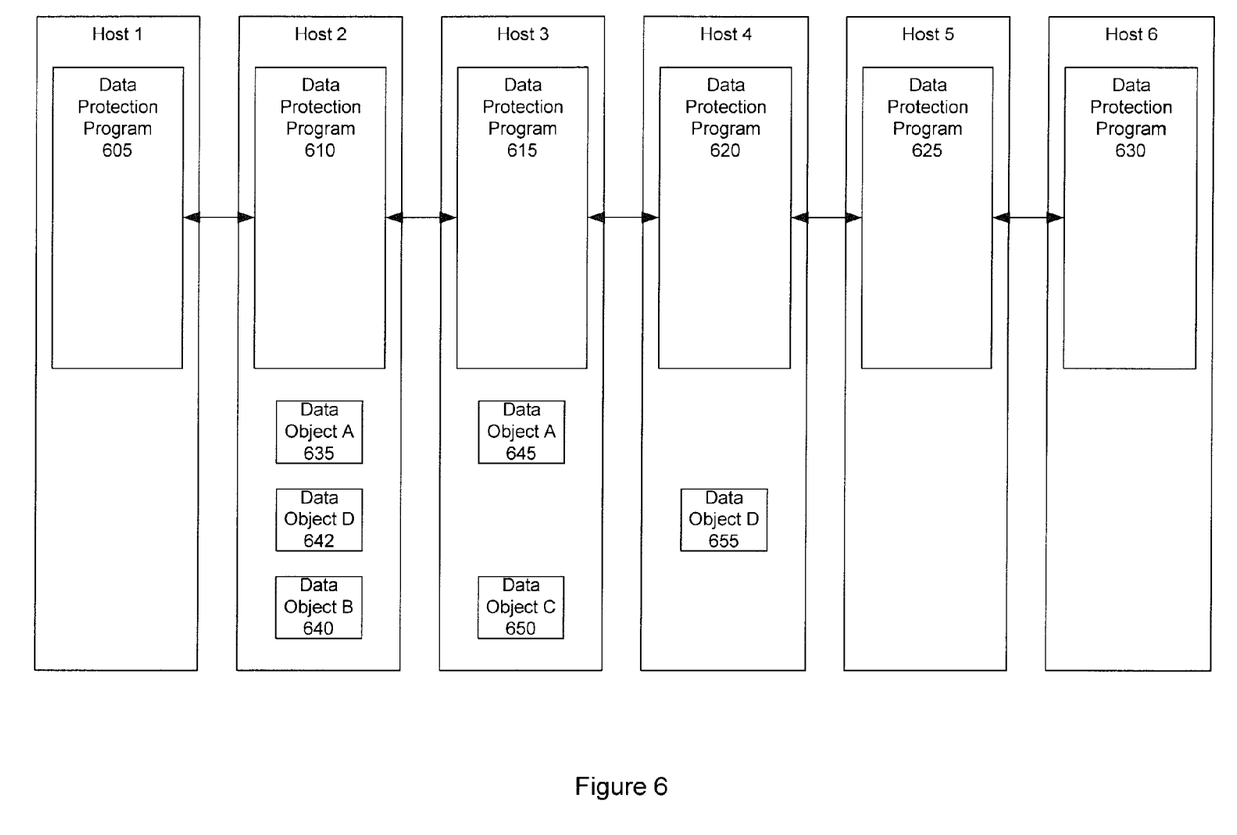
FIG. 6 shows a block diagram of the network host environment in a first state when the network hosts are scanned for duplicate and unique data objects.

In a step 515, the data protection programs scan the network hosts to identify duplicate data objects and non-duplicate data objects stored on the network hosts. For example, FIG. 6 shows a simplified block diagram of the environment shown in FIG. 4. As shown in FIG. 6, data protection programs 605, 610, 615, 620, 625, and 630 are installed on network hosts 1, 2, 3, 4, 5, and 6, respectively. A first data object A 635, a data object B 640, and a first data object D 642 are stored on host 2. A second data object A 645 and a data object C 650 are stored on host 3. A second data object D 655 is stored on host 4.

In a specific implementation, each data protection program at a host creates an inventory listing the data objects stored at the host and distributes the inventory list to the other hosts. The inventory list includes an identification of a network host and identifications of the data objects stored at the network host.

Figure 7A:
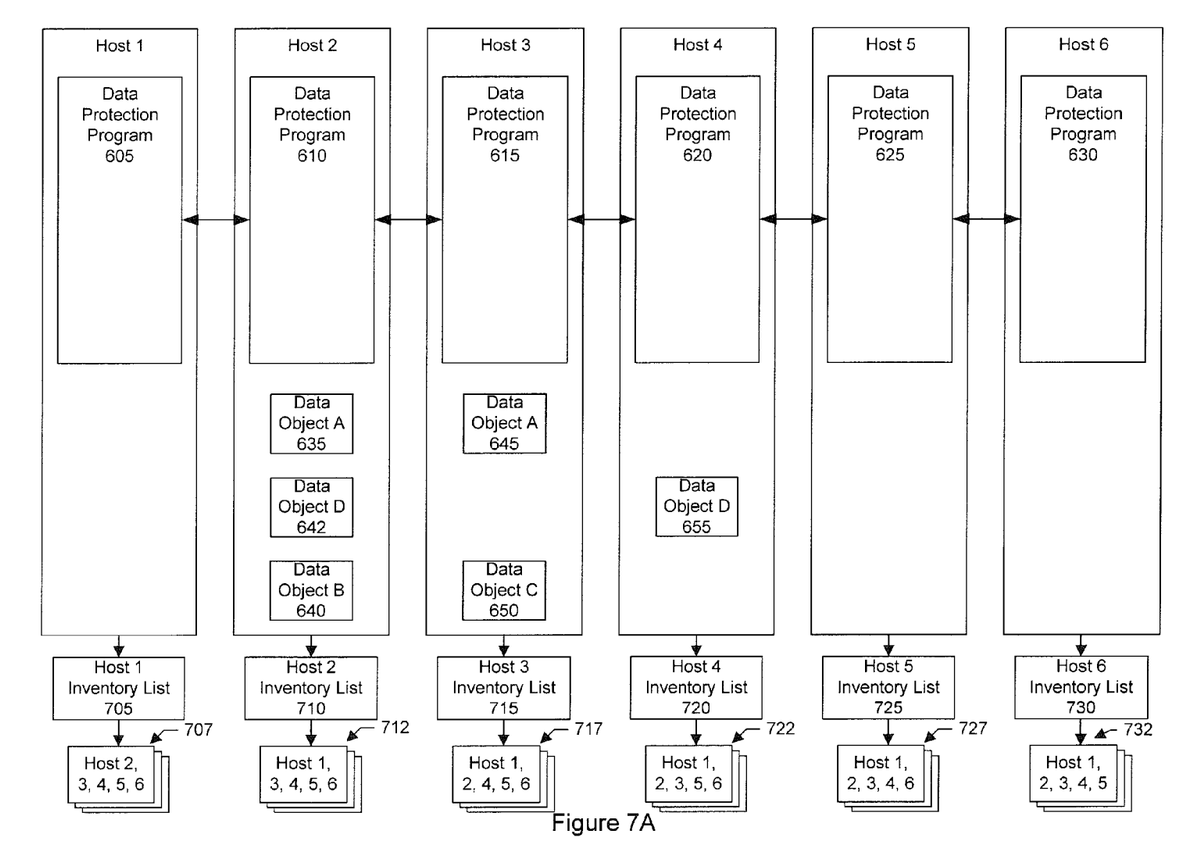
FIG. 7A shows a block diagram of the network host environment where data object inventory lists are shared among the network hosts.

For example, as shown in FIG. 7A, data protection program 605 at host 1 may create an inventory list 705 that is shared with or distributed 707 to hosts 2-6. Data protection program 610 at host 2 may create an inventory list 710 that is distributed 712 to hosts 1 and 3-6. Data protection program 615 at host 3 may create an inventory list 715 that is distributed 717 to hosts 1-2 and 4-6. Data protection program 620 at host 4 may create an inventory list 720 that is distributed 722 to hosts 1-3 and 5-6. Data protection program 625 at host 5 may create an inventory list 725 that is distributed 727 to hosts 1-4 and 6. Data protection program 630 at host 6 may create an inventory list 730 that is distributed 732 to hosts 1-5. The inventory list allows each network host to track, monitor, or be aware of the data objects stored at the other hosts. Thus, if a network host should fail or become unavailable such as due to host maintenance the other hosts can consult the inventory or tracking lists to determine and identify the data that should be sent to the replacement network host in order to rebuild the data objects that had been on the now failed or unavailable network host.

In a specific implementation, an inventory list from a network host identifies data objects stored at the network host using a hash of the data object. In this specific implementation, determining whether one data object is a duplicate of another data object is based on comparing the hash values of the data objects. If the hash values match, a determination is made that the data objects are duplicates of each other. If the hash values do not match, a determination is made that the data objects are not duplicates or are non-duplicates of each other, i.e., that the data objects are unique from each other.

During the scanning, each data protection program on the respective network host may apply a hash function to the data objects stored on the network host to calculate or generate a set of hash values, each hash value being assigned to a data object on the respective network host. The set of hash values calculated at one network host is compared with the sets of hash values calculated at the other network hosts. If there is at least one matching hash value, a determination is made that the data objects are duplicates. If there is not at least one matching hash value, a determination is made that the data objects are non-duplicates.

In a specific implementation, non-duplicate data objects are data objects that are stored on only one of a plurality of network hosts and duplicate data objects are data objects that are stored on two or more of the plurality of the network hosts. Two or more copies of a data object stored on one host only may be considered to be a non-duplicate data object because the data object is found on only a single host. Two or more copies of a data object stored on separate or different hosts may be considered a duplicate data object because the data object can be found on two or more hosts. For example, data object B 640 on host 2 may be identified as a non-duplicate data object because it is stored on only one of the network hosts, i.e., host 2. First data object A 635 on host 2 and second data object A 645 on host 3 may be identified as being duplicate data objects because they are stored on two or more of the hosts, i.e., hosts 2 and 3.

More particularly, data protection program 610 at network host 2 can apply a hash function to first data object A 635 to calculate or generate a first hash value. Data protection program 615 at network host 3 can apply the hash function to second data object A 645 to calculate or generate a second hash value. The data protection programs exchange the calculated hash values. That is, data protection program 610 at host 2 may send the first hash value to the other data protection programs (e.g., data protection programs 605 at host 1, 615 at host 3, 620 at host 4, 625 at host 5, and 630 at host 6). Likewise, data protection program 615 at host 3 may second the second hash value to data protection programs 605 at host 1, 610 at host 2, 620 at host 4, 625 at host 5, and 630 at host 6.

Upon receipt of the hash values at a network host, the data protection program at the network host compares the received hash values with the hash values assigned to or associated with the data objects stored at the network host to identify duplicate data objects and non-duplicate data objects. In this example, based on a comparison of the hash values, a determination may be made that first data object A 635 and second data object A 645 are the same or are duplicates. A determination may be made that first data object D 642 and second data object D 655 are the same or are duplicates.

In a specific implementation, duplicate data objects are maintained, saved, stored, or preserved on the network hosts. That is, the duplicate data objects are not deleted or removed. Rather, the duplicate data objects are allowed or permitted to remain on the network hosts. In another specific implementation, the system may maintain two duplicates of a particular data object at most where each duplicate is stored on a separate host. This can help to conserve storage space while ensuring that the data object can be recovered from one of the hosts if the other host becomes unavailable.

A determination may be made that data objects B 640 and C 650 are unique or are non-duplicates. That is, data object B is different from first data object A, second data object A, data object C, first data object D, and second data object D. Data object C is different from first data object A, second data object A, data object B, first data object D, and second data object D. In a specific implementation, each data protection program creates and maintains a list that identifies and tracks the non-duplicate and duplicate data objects and their host locations. Further discussion of the non-duplicate and duplicate data object lists is provided below.

Referring now FIG. 5, in a step 520, each non-duplicate data object on a network host is divided, separated, or broken into a set of chunks and an associated parity calculation is made for the chunks. A parity calculation is based on an exclusive-OR (XOR) function or logical operation applied to the chunks or chunk content. The resulting parity value or parity data allows the chunks to be reconstructed or rebuilt if any one of the chunks becomes unavailable such from media error or device failure.

Figure 7B:
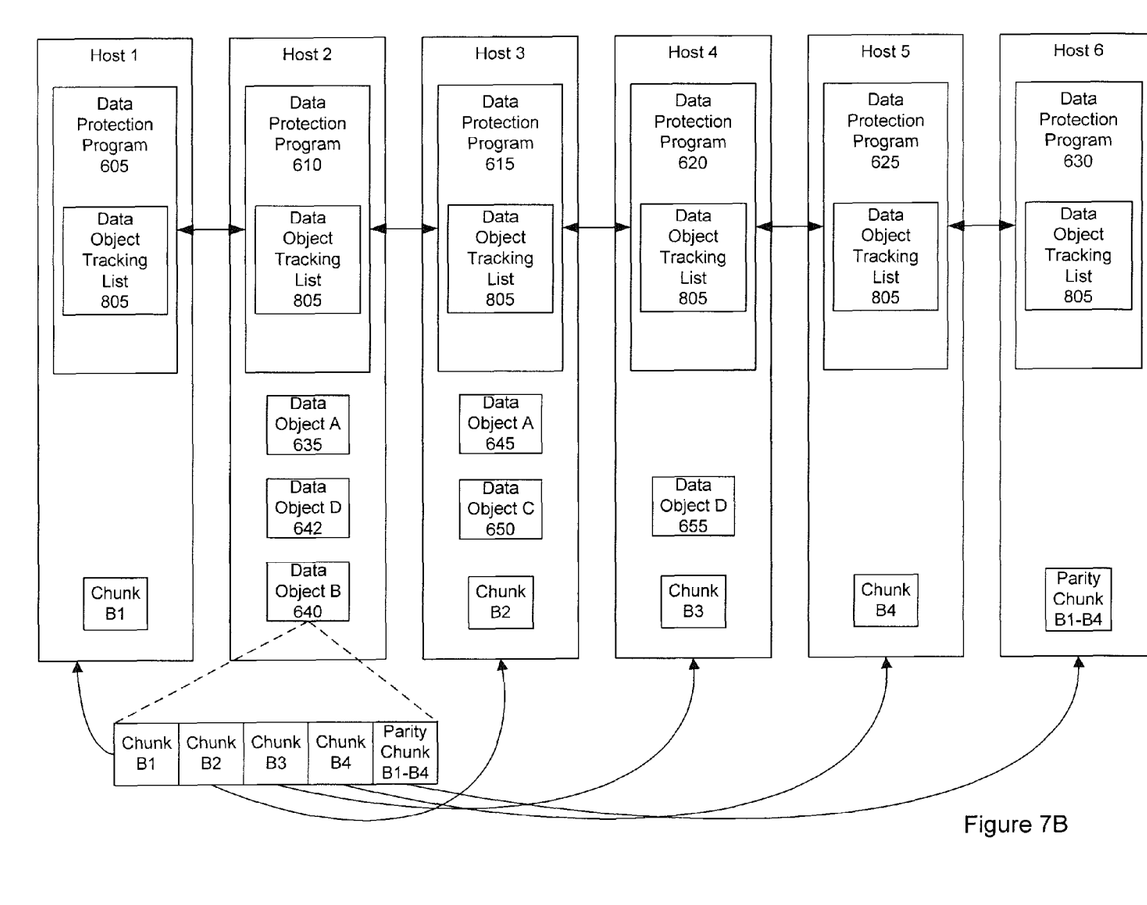
FIG. 7B shows a block diagram of the network host environment in a second state where duplicate data objects are maintained on the network hosts and unique data objects are broken into chunks and distributed.

In a step 525, the data protection program transmits or copies the chunks onto at least a subset of the network hosts. For example, as shown in FIG. 7B, data object B on network host 2 has been divided or broken into chunks B1-B4. Chunks B1-B4 have been copied onto or transmitted to hosts 1 and 3-5, respectively, for storage. In a step 530, the parity chunk associated with the copied chunks is stored on another network host, different from a network host of the at least a subset of network hosts. For example, as show in FIG. 7B, parity chunk B1-B4 that is associated with chunks B1-B4 has been transmitted to network host 6 for storage.

In a specific implementation, there can be a dedicated host that stores the parity chunks for each of the non-duplicate data objects. For example, a host may store first and second parity chunks where the first parity chunk is associated with a first non-duplicate data object and the second parity chunk is associated with a second non-duplicate data object. In another specific implementation, the parity chunks may be spread across two or more hosts. For example, a first host may store a first parity chunk associated with a first non-duplicate data object. A second host may store a second parity chunk associated with a second non-duplicate data object.

Although FIG. 7B shows a data object (e.g., data object B 640) being divided into four chunks, it should be appreciated that a data object may be divided into any number of chunks. The number of chunks that a non-duplicate data object is divided into may be a constant or may vary based on factors such as the size of the non-duplicate data object, the number of network hosts, or both.

For example, the number of chunks may be proportional or inversely proportional to the size of the non-duplicate data object. The number of chunks may be proportional or inversely proportional to the number of network hosts. A data object that is divided into many smaller chunks that are spread across many hosts may help to ease network congestion because the size of the chunks will be smaller. A data object that is divided into fewer chunks of a larger size that are spread across a fewer number of hosts may allow for faster reconstruction of the data object because the chunks can be retrieved from a fewer number of hosts as compared to the case where the chunks are smaller and spread across a greater number of hosts.

Further, although FIG. 7B shows a chunk being copied to each host, it should be appreciated that FIG. 7B is merely an example. At least one chunk of a non-duplicate data object may be copied onto at least one host. There can be other hosts which do not have a chunk of the non-duplicate data object. In a specific implementation, a host having a chunk of a non-duplicate data object may not also have another chunk of the non-duplicate data object. Thus, if the host should fail or otherwise become unavailable only one chunk of the non-duplicate data object will be missing, rather than two or more chunks, and the non-duplicate data object will be able to be rebuilt using the parity and remaining chunks.

In a specific implementation, a non-duplicate data object, such as data object B 640 on host 2, is stored on a host in an undivided format, form, or version. This can allow the non-duplicate data object to be quickly retrieved from the host because chunks of the non-duplicate data object will not have to be retrieved from the other hosts and across the network. In another specific implementation, a non-duplicate data object on a host may be deleted after the non-duplicate data object has been divided into the chunks and the chunks distributed to at least a subset of hosts. Deleting the non-duplicate data object on the host can help to conserve storage space on the host. The non-duplicate data object, however, can be reconstructed through the distributed chunks. In various specific implementations, a non-duplicate data object may be stored on a host in a first and second format. The second format is an undivided format of the non-duplicate data object. The first format is a divided format of the non-duplicate data object. Alternatively, a non-duplicate data object may be stored on a host in only one or at most a single format. The single format may be a divided format of the non-duplicate data object or an undivided format of the non-duplicate data object.

In a specific implementation, the chunks are compressed in order to help reduce the consumption of resources such as data space, transmission capacity, or both. Some examples of data compression algorithms that may be used include lossless data compression (e.g., Lempel-Ziv (LZ) compression, Deflate, LZ77, LZ78A, or LZR) and lossy data compression (e.g., lossy transform codecs or lossy predictive codecs). A data chunk of a non-duplicate data object may be compressed before the data chunk is transmitted or copied to another network host. Alternatively, the data chunk may be compressed after the data chunk has been transmitted or copied to the other network host.

In a specific implementation, each data protection program at a network host maintains one or more lists, tables, inventories, catalogs, directories, indexes, or manifests that identifies, locates, and tracks data objects (or data chunks) that may be stored at the network host, stored at other network hosts, or both. If a network host should fail or otherwise become unavailable and be replaced with a new network host, the other or remaining network hosts can consult the lists to determine which data objects (or data chunks) to send to the new network host. Thus, the new network host can be rebuilt or restored with the data that had been stored at the now failed or unavailable network host.

Figure 8:
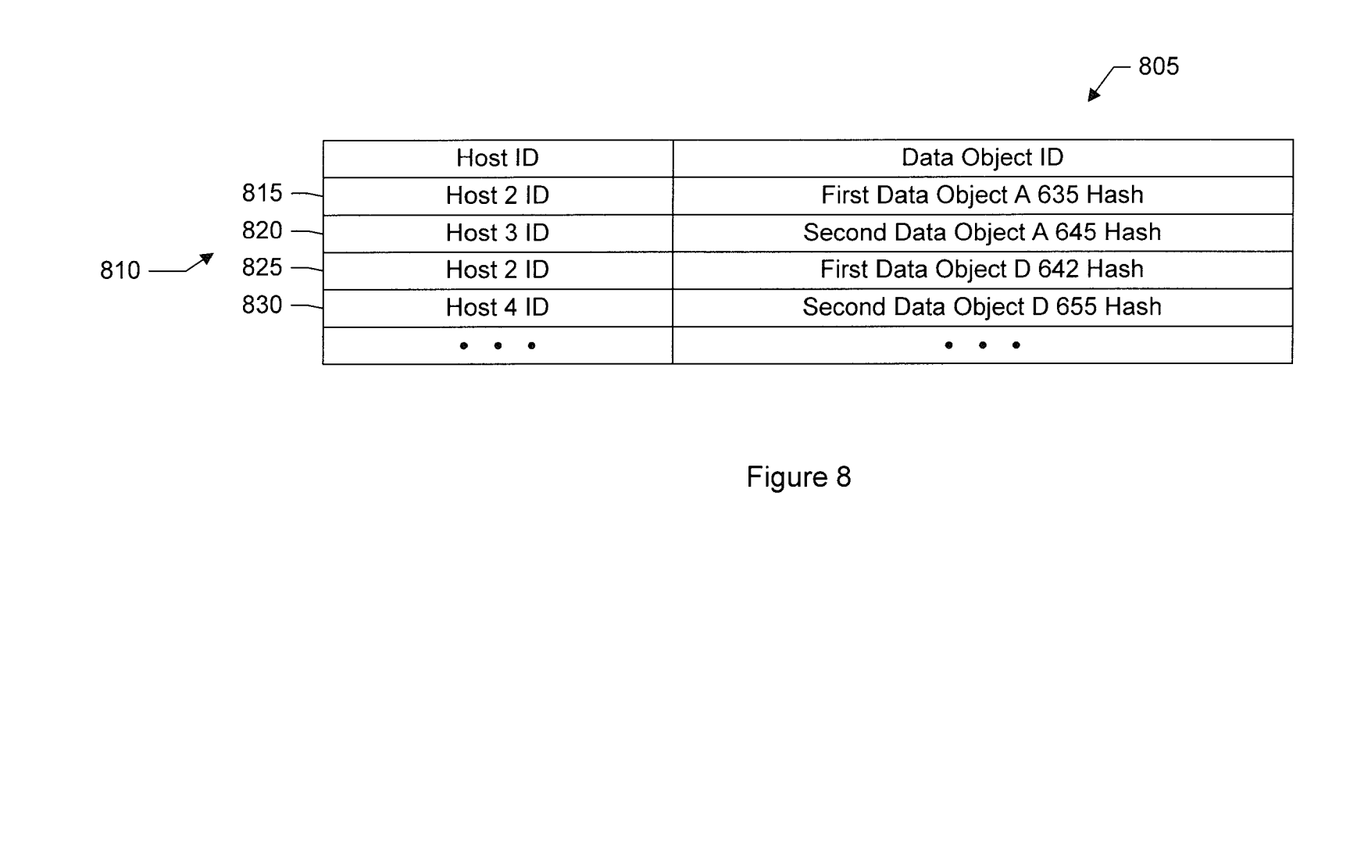
FIG. 8 shows an example of a data object tracking list that may be stored at each network host.

FIG. 8 shows an example of a data object tracking list 805 that may be maintained by each data protection program and stored at each network host. A data object tracking list at a network host may be created by combining the inventory lists received from the other network hosts. The list includes a set of records or entries 810. Each record includes a first field and a second field. The first field stores a network host identifier. The second field stores a data object or data chunk identifier.

The network host identifier may include any value or combination of values that can be used to identify the network host. A network host identifier may include a hostname, host address, domain, host IP address, or combinations of these. Similarly, the data object identifier may include any value or combination of values that can be used to identify a particular data object. In a specific implementation, the data object identifier includes a hash or hash value of the data object.

For example, a record 815 includes a network host identifier for host 2 and a hash value for first data object A. Record 815 thus indicates that first data object A is stored on host 2. Likewise, a record 820 indicates that second data object A is stored on host 3. A record 825 indicates that first data object D is stored on host 2. A record 830 indicates that second data object D is stored on host 4.

Referring now to FIG. 5, in a step 535, if a network host crashes or otherwise becomes unavailable. The failed network host may be replaced with a new network host. A data protection program is installed on the new network host. The data that had been stored on the failed network host may be rebuilt on the new network host. Specifically, the non-duplicate data objects that had been stored on the failed network host may be rebuilt on the new network host by using the chunks or remaining chunks of the non-duplicate data object that were transmitted or copied onto the subset of network hosts, and the associated parity chunk (steps 520-530).

In a step 540, the duplicate data objects that had been stored on the failed network host may be rebuilt on the new network hosts by using the corresponding duplicate data objects stored or maintained on the other network hosts.

Figure 9:
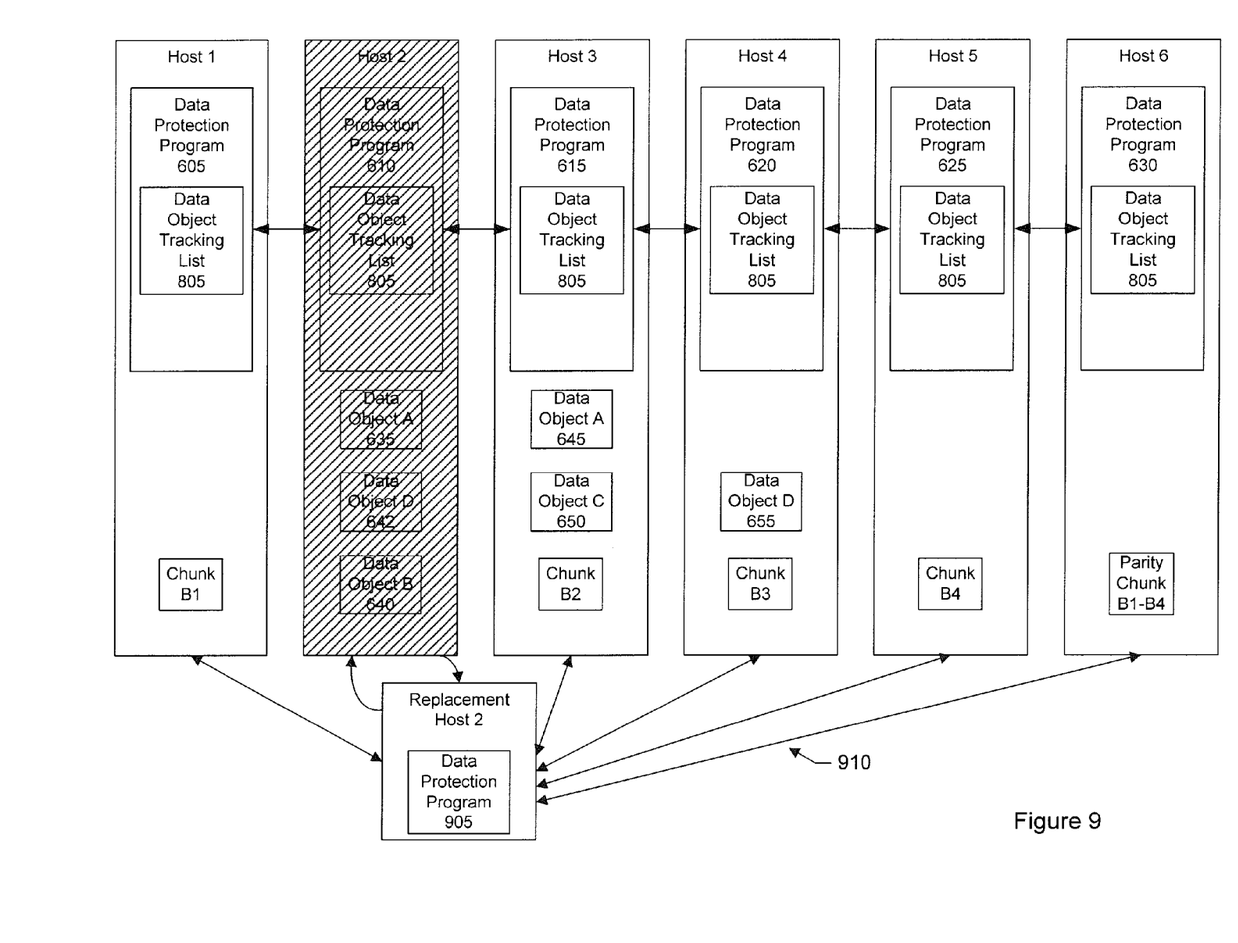
FIG. 9 shows a block diagram of the network host environment in a third state where a network host has failed.

For example, FIG. 9 shows an example of network host 2 experiencing a failure, as indicated by the diagonal pattern, and being replaced with a replacement or new host 2. A data protection program 905 is installed on replacement host 2. Data protection program 905 communicates 910 with one or more of the other remaining hosts in the network in order to rebuild the data that had been stored on network host 2. Data protection program 905 may communicate with the other data protection programs via domain and host name to request data. The other data protection programs may communicate in reverse to provide the required data to rebuild the original data that had been stored on the failed network host 2.

In a specific implementation, a data protection program on a replacement host broadcasts a request to the remaining hosts for the data that had been stored on a failed host. The broadcasted request includes a host identifier that identifies the failed host. A remaining host receives the broadcasted request from the replacement host. The remaining host consults a data object tracking list stored at the remaining host to determine whether or not the remaining host has any data that had been stored by the failed host, transmitted previously from the failed host to the remaining host, or both. If the remaining host has such data, the remaining host transmits the data to the replacement host so that the replacement host can be rebuilt with data that had been stored on the failed host.

In this example, replacement host 2 broadcasts a request to the remaining hosts (e.g., host 1 and host 3-6) for the data that had been stored on failed host 2, transmitted previously from failed host 2 to the remaining hosts, or both. The request includes an identifier that identifies failed host 2. The request is received by the other or remaining hosts. Remaining host 3, for example, consults data object tracking list 805 (FIG. 8) to determine whether or not host 3 has any data that had been stored by failed host 2, any data that had been previously distributed from failed host 2 to host 3, or both. For example, host 3 may use the received host 2 identifier to scan the data object tracking list for matching records. Based on the scan, there is a match with record 815 because the host identifier in record 815 matches received host 2 identifier. Host 3 extracts from record 815 the corresponding data object identifier, i.e., first data object A hash. Host 3 uses the corresponding data object identifier, i.e., first data object A hash to scan the data object tracking list for matching records. Based on the scan, there is a match with record 820 because the second data object A hash matches the extracted first data object A hash from record 815. Record 820 indicates that second data object A (which is a duplicate of first data object A) is stored at host 3. Host 3 retrieves second data object A and transmits second data object A to replacement host 2.

Likewise, host 4 may receive the request broadcast from replacement host 2. Host 4 similarly consults the data object tracking list. Upon consulting the data object tracking list, host 4 determines that first data object D had been stored at host 2, that second data object D is a duplicate of first data object D, and that host 4 has second data object D. Host 4 then transmits second data object D to replacement host 2.

Non-duplicate data objects that had been stored at the failed host may be rebuilt on the replacement host using the parity data. For example, unique data object B 640 may be reconstructed on replacement host 2 by applying an XOR operation to the distributed data chunks and parity chunk B1-B4.

Figure 10:
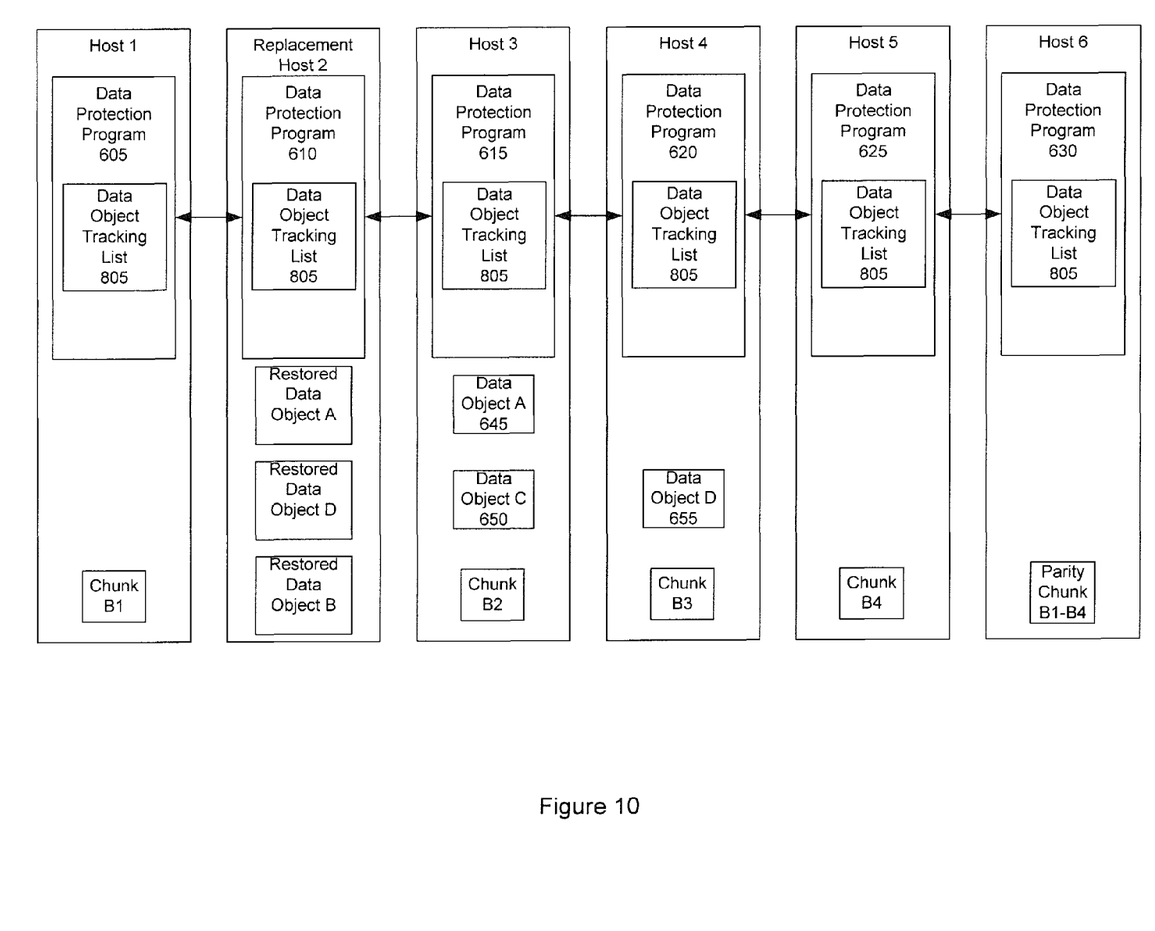
FIG. 10 shows a block diagram of the network host environment in a fourth state where the failed network host has been replaced with a new network host and the data has been recovered.

FIG. 10 shows an example of replacement host 2 having been rebuilt or restored with the data that had been stored at failed host 2. As shown in FIG. 10, replacement host 2 includes a restored data object A 1010, a restored data object D 1015, and a restored data object B 1020. Restored data object A is based on the receipt of corresponding duplicate data object A 645 from host 3. Restored data object D is based on the receipt of corresponding duplicate data object D 655 from host 4. Restored data object B is based on the parity protection scheme for the non-duplicate data objects. In a specific implementation, each network host maintains a data object tracking list for a restoration of a failed system or failed network host. In the event of a failure of a network host, data that had been stored on the failed network host may be rebuilt on a replacement network host using hashes of duplicate data blocks, chunks of unique blocks, parity of unique blocks, or combinations of these.

Referring now to FIG. 9, the broadcast routing of requests for data helps to ensure that data stored on the failed host is quickly rebuilt on the replacement host because the requests may be processed concurrently or simultaneously by the remaining hosts.

In another specific implementation, a replacement host implements a round-robin routing algorithm when making requests for data. In this specific implementation, the replacement host may include a list identifying the other or remaining hosts on the network. The replacement host issues a first request to a first remaining host for data previously stored on a failed host that may be on the first remaining host. The first request includes an identification of the failed host. In a first response to the first request, the first remaining host transmits first data to the replacement host. The first data includes a duplicate or copy of the data stored at the failed host. After the replacement host receives the first response, the replacement host issues a second request to a second remaining host for data previously stored on the failed host that may be on the second remaining host. The second request includes the identification of the failed host and an identification of the first data so that any copies of the first data that may be at the second remaining host are not resent or transmitted to the replacement host. Not resending copies the first data can help to reduce network congestion.

In a specific implementation, a method for protecting data includes identifying non-duplicate data objects that are stored on only one of a plurality of network hosts and duplicate data objects that are stored on two or more of the plurality of the network hosts, dividing, into a plurality of chunks, each non-duplicate data object, copying at least one of the plurality of chunks of each non-duplicate data object on to at least a second of the plurality of network hosts, and storing a parity chunk associated with the plurality of chunks of each non-duplicate data object on at least a third network host. The method may further include rebuilding, on a new network host, at least one non-duplicate data object using at least one of the plurality of chunks of that non-duplicate data object and the associated parity chunk, and rebuilding, on the new network host, at least one duplicate data object using one of the duplicates of that data object.

In a specific embodiment, the data protection programs and accompanying data protection schemes are implemented in a RAID level 5 storage configuration. It should be appreciated, however, that aspects of the invention can be applicable to other types of storage configuration.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A system for data protection, the system comprising:
    one or more processors; and
    a non-transitory computer readable medium storing a plurality of instructions, which when executed, cause the one or more processors to:
        identify, periodically, non-duplicate data objects that are stored on only one of a plurality of network hosts and duplicate data objects that are stored on two or more of the plurality of the network hosts;
        divide, into a plurality of chunks, each non-duplicate data object;
        copy at least one of the plurality of chunks of each non-duplicate data object on to at least a second of the plurality of network hosts;
        store a parity chunk associated with the plurality of chunks of each non-duplicate data object on at least a third network host;
        rebuild, on a new network host, at least one non-duplicate data object using at least one of the plurality of chunks of that non-duplicate data object and the associated parity chunk; and
        rebuild, on the new network host, at least one duplicate data object using one of the duplicates of that data object.

2. The system of claim 1 wherein the plurality instructions, when executed, further cause the one or more processors to:
    maintain a first duplicate data object stored on one of the two or more network hosts; and
    maintain a second duplicate data object stored on another of the two or more network hosts, wherein the second duplicate data object is a duplicate of the first duplicate data object.

3. The system of claim 1 wherein plurality instructions, when executed, further cause the one or more processors to:
    transmit, from the new network host, a request to the at least second network host for the at least one non-duplicate data object to be rebuilt on the new network host.

4. The system of claim 3 wherein the new network host replaces a failed network host of the plurality of network hosts and the request comprises an identifier associated with the failed network host to permit the at least second network host to determine that the at least one non-duplicate data object had been stored on the failed network host and should be rebuilt on the new network host.

5. The system of claim 1 wherein the plurality instructions, when executed, further cause the one or more processors to:
    receive, at the new network host, one of the duplicates of the at least one duplicate data object.

6. A method comprising:
    identifying, periodically, non-duplicate data objects that are stored on only one of a plurality of network hosts and duplicate data objects that are stored on two or more of the plurality of the network hosts;
    dividing, into a plurality of chunks, each non-duplicate data object;
    copying at least one of the plurality of chunks of each non-duplicate data object on to at least a second of the plurality of network hosts;
    storing a parity chunk associated with the plurality of chunks of each non-duplicate data object on at least a third network host;
    rebuilding, on a new network host, at least one non-duplicate data object using at least one of the plurality of chunks of that non-duplicate data object and the associated parity chunk; and
    rebuilding, on the new network host, at least one duplicate data object using one of the duplicates of that data object.

7. The method of claim 6 further comprising:
    maintaining a first duplicate data object stored on one of the two or more network hosts; and
    maintaining a second duplicate data object stored on another of the two or more network hosts, wherein the second duplicate data object is a duplicate of the first duplicate data object.

8. The method of claim 6 wherein the new network host replaces a failed network host of the plurality of network hosts and the request comprises an identifier associated with the failed network host to permit the at least second network host to determine that the at least one non-duplicate data object had been stored on the failed network host and should be rebuilt on the new network host.

9. The method of claim 6 further comprising:
receiving, at the new network host, one of the duplicates of the at least one duplicate data object.

10. The method of claim 6 wherein the identifying non-duplicate and duplicate data objects comprises:
generating hashes of the data objects.

11. A computer program product, comprising a non-transitory computer-readable medium having a computer-readable program code embodied therein, the computer-readable program code adapted to be executed by one or more processors to:
identify, periodically, non-duplicate data objects that are stored on only one of a plurality of network hosts and duplicate data objects that are stored on two or more of the plurality of the network hosts;
divide, into a plurality of chunks, each non-duplicate data object;
copy at least one of the plurality of chunks of each non-duplicate data object on to at least a second of the plurality of network hosts;
store a parity chunk associated with the plurality of chunks of each non-duplicate data object on at least a third network host;
rebuild, on a new network host, at least one non-duplicate data object using at least one of the plurality of chunks of that non-duplicate data object and the associated parity chunk; and
rebuild, on the new network host, at least one duplicate data object using one of the duplicates of that data object.

12. The computer program product of claim 11 wherein the program code includes further instructions to:
maintain a first duplicate data object stored on one of the two or more network hosts; and
maintain a second duplicate data object stored on another of the two or more network hosts, wherein the second duplicate data object is a duplicate of the first duplicate data object.

13. The computer program product of claim 11 wherein the new network host replaces a failed network host of the plurality of network hosts and the request comprises an identifier associated with the failed network host to permit the at least second network host to determine that the at least one non-duplicate data object had been stored on the failed network host and should be rebuilt on the new network host.

14. The computer program product of claim 11 wherein the program code includes further instructions to:
receiving, at the new network host, one of the duplicates of the at least one duplicate data object.

15. The computer program product of claim 14 wherein the program code includes further instructions to compress the at least one of the plurality of chunks.

\* \* \* \* \*